United States Patent
Darling et al.

(10) Patent No.: US 8,688,838 B2
(45) Date of Patent: Apr. 1, 2014

(54) PROFILE MANAGEMENT SYSTEMS

(75) Inventors: Jim Darling, Fort Collins, CO (US); Jeffrey McMenomey, Rocklin, CA (US); Daniel N. Cripe, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 974 days.

(21) Appl. No.: 12/637,532

(22) Filed: Dec. 14, 2009

(65) Prior Publication Data

US 2011/0145414 A1  Jun. 16, 2011

(51) Int. Cl.
G06F 15/16 (2006.01)
G06F 15/177 (2006.01)
G06F 15/173 (2006.01)

(52) U.S. Cl.
USPC ........... 709/226; 709/203; 709/219; 709/220; 709/221; 709/223; 709/229; 709/250

(58) Field of Classification Search
None
See application file for complete search history.

(56) References Cited

U.S. PATENT DOCUMENTS

| | | | |
|---|---|---|---|
| 5,544,347 A | | 8/1996 | Yanai et al. |
| 5,606,693 A | | 2/1997 | Nilsen et al. |
| 6,038,677 A | | 3/2000 | Lawlor et al. |
| 6,173,420 B1 | | 1/2001 | Sunkara et al. |
| 6,324,654 B1 | | 11/2001 | Wahl et al. |
| 6,330,605 B1 * | | 12/2001 | Christensen et al. ......... 709/226 |
| 6,411,506 B1 | | 6/2002 | Hipp et al. |
| 6,557,008 B1 | | 4/2003 | Temple, III et al. |
| 6,654,771 B1 | | 11/2003 | Parham et al. |
| 6,691,165 B1 * | | 2/2004 | Bruck et al. .................. 709/227 |
| 6,801,949 B1 * | | 10/2004 | Bruck et al. .................. 709/232 |
| 6,856,926 B2 | | 2/2005 | Monfared et al. |
| 6,865,157 B1 * | | 3/2005 | Scott et al. .................... 370/242 |
| 6,928,478 B1 * | | 8/2005 | Gangadharan ................ 709/226 |
| 6,944,785 B2 * | | 9/2005 | Gadir et al. ................... 714/4.11 |
| 6,993,583 B2 * | | 1/2006 | Anderson et al. ............. 709/226 |
| 7,017,049 B2 * | | 3/2006 | Hand et al. ...................... 726/22 |
| 7,065,616 B2 | | 6/2006 | Gajjar et al. |
| 7,124,171 B1 * | | 10/2006 | McCann ....................... 709/216 |
| 7,159,022 B2 * | | 1/2007 | Primm et al. ................. 709/224 |
| 7,165,083 B2 | | 1/2007 | Sakaguchi et al. |
| 7,246,224 B2 | | 7/2007 | Rothman et al. |
| 7,290,167 B2 | | 10/2007 | Fujibayashi |
| 7,310,736 B2 | | 12/2007 | Rothbarth et al. |
| 7,320,068 B2 | | 1/2008 | Zimniewicz et al. |
| 7,325,149 B2 | | 1/2008 | Liu et al. |
| 7,383,463 B2 | | 6/2008 | Hayden et al. |
| 7,389,411 B2 * | | 6/2008 | King et al. .................... 713/151 |
| 7,392,423 B2 | | 6/2008 | Henrickson |

(Continued)

OTHER PUBLICATIONS

US Patent and Trademark Office, Office Action, Sep. 21, 2009, U.S. Appl. No. 11/694,223 of Daniel N. Cripe et al., 9 pg.

*Primary Examiner* — Thu Nguyen
*Assistant Examiner* — Angela Widhalm (57) ABSTRACT

Systems and methods for profile management on a network are disclosed. A profile management system for first and second servers on the network may include a profile manager configured to manage a first profile that uniquely identifies the first server on the network; and an administrator configured to issue a command to the profile manager instructing the profile manager to migrate the first profile such that the first profile is no longer associated with the first server, and such that the first profile uniquely identifies the second server on the network, wherein at least one of the first and second servers is a conjoined server.

16 Claims, 5 Drawing Sheets

(56) References Cited

U.S. PATENT DOCUMENTS

| | | | |
|---|---|---|---|
| 7,444,405 B2* | 10/2008 | Gangadharan | 709/226 |
| 7,539,854 B2 | 5/2009 | Rothman et al. | |
| 7,577,720 B2* | 8/2009 | Vertes et al. | 709/219 |
| 7,818,408 B1* | 10/2010 | Ignatuk et al. | 709/221 |
| 8,041,789 B1* | 10/2011 | Bobco et al. | 709/220 |
| 2002/0004857 A1 | 1/2002 | Arakawa et al. | |
| 2003/0018927 A1* | 1/2003 | Gadir et al. | 714/4 |
| 2003/0065730 A1* | 4/2003 | Jones et al. | 709/208 |
| 2003/0158933 A1* | 8/2003 | Smith | 709/224 |
| 2005/0163123 A1* | 7/2005 | Gangadharan | 370/392 |
| 2005/0268152 A1* | 12/2005 | Yamaguchi et al. | 714/4 |
| 2006/0010176 A1 | 1/2006 | Armington | |
| 2006/0153188 A1* | 7/2006 | Doi et al. | 370/389 |
| 2006/0259604 A1 | 11/2006 | Kotchavi et al. | |
| 2007/0038887 A1 | 2/2007 | Witte et al. | |
| 2007/0174673 A1 | 7/2007 | Kawaguchi et al. | |
| 2007/0220376 A1 | 9/2007 | Furukawa | |
| 2007/0282985 A1* | 12/2007 | Childress et al. | 709/223 |
| 2007/0288543 A1 | 12/2007 | Evans et al. | |
| 2007/0288710 A1 | 12/2007 | Boyd et al. | |
| 2007/0294577 A1 | 12/2007 | Fiske | |
| 2008/0215667 A1 | 9/2008 | Rothbarth et al. | |
| 2008/0215714 A1* | 9/2008 | Shimmura et al. | 709/221 |
| 2008/0244060 A1 | 10/2008 | Cripe et al. | |
| 2008/0313476 A1 | 12/2008 | Hansen | |
| 2009/0227274 A1 | 9/2009 | Adler et al. | |
| 2009/0228536 A1 | 9/2009 | Rauhala | |
| 2010/0214949 A1* | 8/2010 | Smith et al. | 370/254 |

\* cited by examiner

PROFILE MANAGEMENT SYSTEMS

BACKGROUND

Networks may include multiple computers (e.g., servers). In some networks, a first server may be designated as a primary server and a second server may be designated as a backup server. If the first server suffers from a technical problem that precludes it from operating properly, the backup server may perform the duties of the first server. Similarly, in some networks, a first server may be designated as a primary server and a second server may be designated as an upgrade server. The first and second servers may be any suitable type(s) of servers. For example, one or both of those servers may be a conjoined server as defined below. Alternatively, or additionally, the second server may be more powerful than the first server in terms of speed, storage space, etc. It may be desirable to have the upgrade server perform the duties of the first server.

In such cases, because the second server assumes the responsibilities of the first server, it is necessary to migrate a "profile" (i.e., low-level hardware identifiers such as media access control (MAC) addresses, Fiber Channel World Wide Names, storage area network (SAN) boot parameters, etc.) of the first server to the second server so that the second server can perform in lieu of the first server. However, such migration poses various technical difficulties which increase both migration time and server downtime.

DETAILED DESCRIPTION

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct or indirect electrical connection.

As used herein, the term "profile" refers to one or more identifiers associated with a computer (e.g., a server). More specifically, an identifier of a computer includes a low-level hardware identifier that may, for example, be hard-coded onto the computer. Examples of such identifiers include media access control (MAC) addresses, Fiber Channel World Wide Names, storage area network (SAN) boot parameters and computer/server serial numbers. A profile associated with a computer may uniquely identify that computer among a plurality of computers (e.g., on a network). For example, on a network having multiple computers, each computer's MAC address may be different from the MAC addresses of the other computers. Further, a profile associated with a computer may identify that computer to software running on that computer. For example, a profile associated with a server may include a server serial number. Licensing software running on that server may use the server serial number to identify the server hardware. A profile may be separated into two or more parts, with each part including one or more identifiers.

As used herein, the term "conjoined server" refers to two or more servers that are directly and/or indirectly connected via optical and/or wireless electrical connection(s) such that those servers are configured to act as a single server on a network. For example, the connected servers are configured to host or run a single operating system or a single operating system instance. Each of the servers that make up or constitute the conjoined server may include a processor, memory, and/or input/output device(s). The connected servers that constitute the conjoined server may be adjacent to each other, may be in the same enclosure and/or may be in different enclosures (which may be in different geographic locations).

Described herein are techniques which positively affect the efficiency of a profile migration from a first server (e.g., a failed server or a server with outdated technology) to a second server (e.g., a backup server or a server with upgraded technology). More specifically, the techniques disclosed herein enable a network administrator or other network authority to transfer a profile—including one or more Globally Unique Identifiers (GUIDs)—from a first server to a second server, thereby enabling the second server to assume the duties of the first server with reduced or minimal server downtime.

Figure 1:
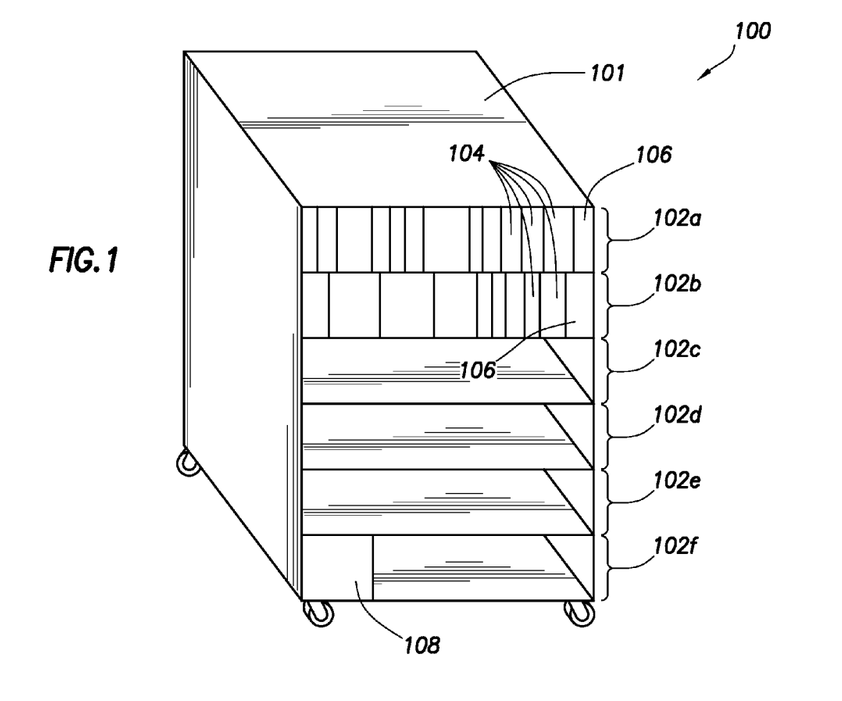
FIG. 1 is a perspective view of a profile management system in accordance with an embodiment of the invention.

FIG. 1 shows an example of a profile management system 100, which may be associated with an electronic device container 101. The container may, for example, have a cuboidal shape and may be composed of metal, plastic, fiberglass and/or any other suitable material. Container 101 may include a server rack. The container may include one or more enclosures 102a-102f. Each enclosure may be capable of storing one or more electronic devices 104 (e.g., blade servers, switches, power supplies). The electronic devices may be controlled by one or more enclosure managers 106. Each enclosure may have its own enclosure manager 106 which manages electronic devices 104 in that enclosure, as shown in FIG. 1. Container 101 may alternatively have a single enclosure manager which manages some or all electronic devices in the container. The container may alternatively have a primary enclosure manager that manages secondary enclosure managers which, in turn, manage the electronic devices. Other management techniques also are possible and are within the scope of this disclosure. Although not specifically shown, each enclosure manager may include circuit logic including a processor, memory (e.g., random access memory (RAM), non-volatile memory (NVM)), etc. In addition to enclosure managers 106 and electronic devices 104, one or more power supplies 108 may be included in the container.

Such power supplies may convert alternating current (AC) power to one or more suitable direct current (DC) voltages for the various electronic devices and enclosures. The enclosure manager may be configured to manage distribution of power from the power supplies to the electronic devices.

Figure 2:
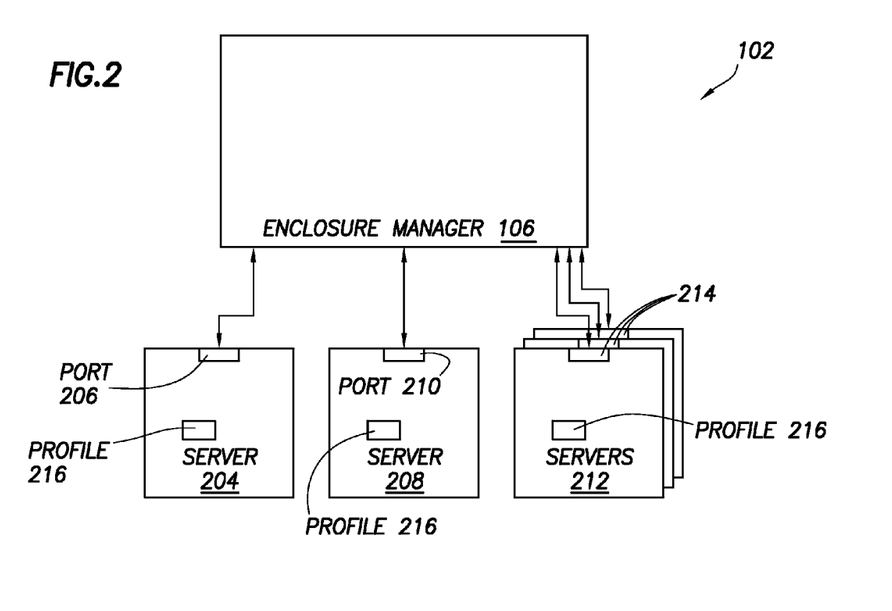
FIG. 2 is a block diagram of an enclosure manager of the profile management system of FIG. 1 in accordance with an embodiment of the invention.

FIG. 2 shows an illustrative block diagram of an enclosure 102. As previously explained, the enclosure may include an enclosure manager 106 of the profile management system. In the example of FIG. 2, enclosure 102 may further include a server 204 having a port 206, a server 208 having a port 210, and one or more additional servers 212 having ports 214. Although the techniques disclosed herein are discussed in terms of two servers housed within a common enclosure 102, the scope of this disclosure also encompasses embodiments in which these techniques may be modified for multiple servers of any suitable type(s) housed within the same or different enclosures. Further, the scope of this disclosure encompasses embodiments in which these techniques may be modified for multiple servers which are housed in different containers 101 and/or even in different geographic locations (e.g., different locations of a city, state, country or internationally). Ports 206, 210 of servers 204 and 208 may enable the servers to communicate with enclosure manager 106. Via the ports, the enclosure manager may transfer information to and receive information from servers 204 and 208.

As mentioned, each server in enclosure 102 may include a profile 216. The profile includes one or more low-level hardware identifiers, such as a media access control (MAC) address, a Fiber Channel World Wide Name, storage area network (SAN) boot parameter, serial number, etc. A profile may uniquely identify the corresponding server in a network. The profile may include information that identifies the server to other electronic devices with which the server interacts. The server profiles may be transferable from one server to another.

Figure 3:
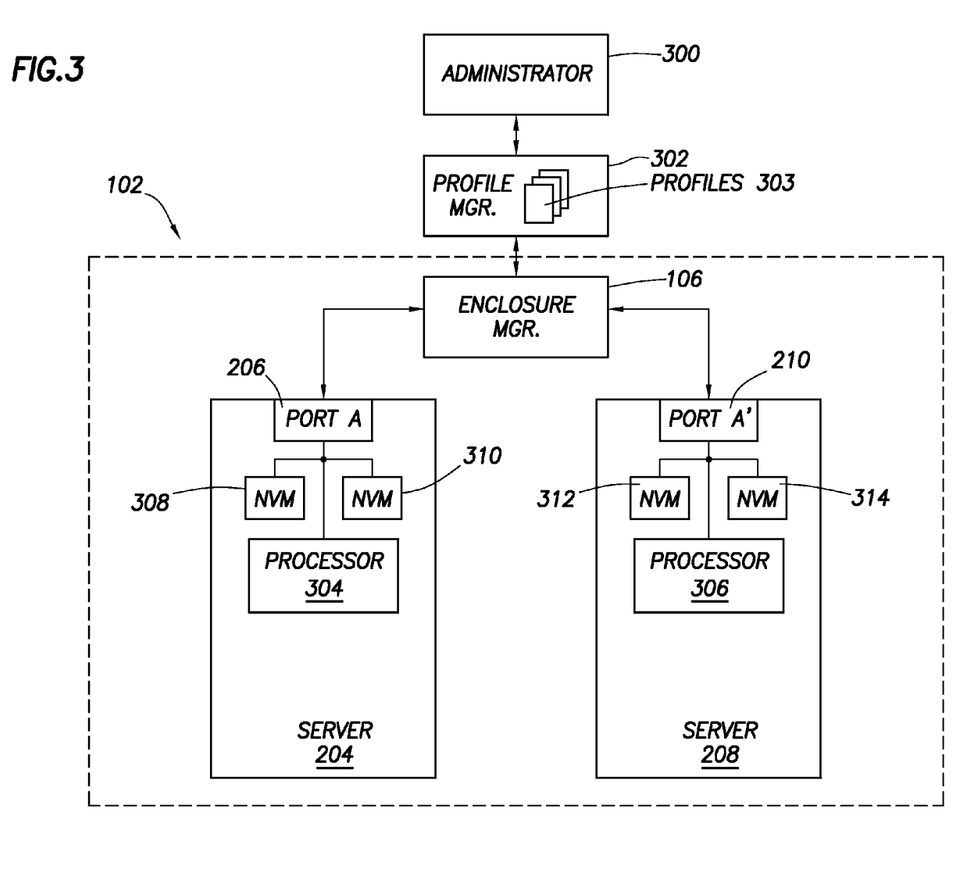
FIG. 3 is a block diagram of the profile management system of FIG. 1 in accordance with an embodiment of the invention.

FIG. 3 shows a profile management system, which may include an administrator 300, a profile manager 302 and enclosure manager 106. Administrator 300 (e.g., an administrative computer) may couple to profile manager 302 comprising multiple profiles 303. The profile manager may include a computer or other suitable circuit logic containing NVM in which data structures, such as profiles 303, are stored. Profile manager 302 may be coupled to enclosure manager 106 of enclosure 102. The enclosure manager may be coupled to servers 204 and 208. Server 204 may include a port 206, which may be coupled to a processor 304, a NVM 308 and another NVM 310. Server 208 may include a port 210, which couples to a processor 306, a NVM 312 and another NVM 314. NVMs 308, 310, 312 and 314 may include, for instance, read-only memory (ROM), flash memory, hard disks, optical discs, etc. Although a particular arrangement of hardware is shown in FIG. 3, the scope of this disclosure is not limited to any particular hardware arrangement. For example, although NVMs 308 and 310 and NVMs 312 and 314 are shown as being separate storage devices, NVMs 308 and 310 may be replaced with a single NVM. Likewise, NVMs 312 and 314 may be replaced with a single NVM.

Profile manager 302 may include one or more profiles (e.g., data structures) 303, each of which may be associated with a different server. Servers 204 and 208 each may have a profile that differs from the profile of the other server. Administrator 300 may issue commands to the profile manager whereby profiles 303 are managed. For example, the administrator may command profile manager 302 to assign a specific profile 303 to a specific server within enclosure 102.

Profiles may be generated by any suitable technique. For example, a profile 303 may be generated by administrator 300 and transferred to profile manager 302. Alternatively, or additionally, a profile may be generated by the profile manager. Profiles may be generated manually (i.e., with human intervention) or automatically (i.e., without human intervention) by administrator 300 or by profile manager 302. Additionally, or alternatively, a server may already contain a profile when the server is installed in enclosure 102. The profile on the installed server may be read by the enclosure manager and a copy of the profile may be transferred to the profile manager for storage. Although particular profile generation techniques are discussed above, the scope of the disclosure is not limited to these techniques for profile generation.

A generated profile 303 may be assigned to a server by administrator 300. The administrator may send a command to profile manager 302 that a specific profile 303 is to be assigned to server 204. The profile manager receives the command and may issue a command to the enclosure manager. The command issued by profile manager 302 to enclosure manager 106 may be generated using a specific profile 303 that is to be assigned to server 204. For example, if specific profile 303 includes a MAC address of 000135288134, an illustrative command sent from profile manager 302 to enclosure manager 106 may be:

set netport206 PermanentAddress=000135288134

This command instructs enclosure manager 106 to set port 206 to an address (e.g., a MAC address) of 000135288134. Upon receiving the command from profile manager 302, the enclosure manager may read the command to determine which server port should receive the command. Because the command is directed to port 206, enclosure manager 106 may forward the command to port 206, which is associated with server 204. Once received by port 206, processor 304 may execute and/or store the command in NVM 308, which in some embodiments includes a memory dedicated to storing received commands. Executing the command may cause processor 304 to set the MAC address of port 206 to 000135288134. In at least some embodiments, a MAC address of port 206 may be set by adjusting a data structure stored in NVM 310. Such a data structure may contain an entry for addresses or other properties associated with port 206, and such an entry may be modified to contain the MAC address 000135288134.

When a specific profile 303 is assigned to a server, such as server 204, additional properties besides a MAC address may additionally, or alternatively, be applied to server 204. Such properties include those described above as being associated with profile 303. Thus, when profile 303 is assigned to a server, one or more of the properties or parts associated with profile 303 may be applied to server 204. A different profile may similarly be applied to server 208 and any other servers or electronic devices that may be present in enclosure 102.

For any of a variety of reasons, a first server may be precluded from operating properly (e.g., the server may "fail"). For example, the first server may become overheated, may short-circuit, may lose power, may contract a virus, etc. In some cases, the first server may perform duties that need to be transferred to an upgraded, more powerful server. In any such cases, it may be necessary for a second server (e.g., a "backup" server or an "upgraded" server) to assume the duties of the first server. The "transfer of duties" from the first server to the second server is known as "migration." Migrating from a first server to a second server may include the transfer of various properties, settings, etc. associated with the first server to the second server. In some cases, migration requires substantial server downtime. For example, in a business, migration may require the prior authorization of unavailable technical personnel. Likewise, the technical process of migration itself may often be tedious and time-consuming. If the first server was performing some vital task (e.g., stock trades for a stockbroker), even a small amount of server downtime can result in the loss of considerable amounts of revenue. Thus, as described below, a server failure or a server upgrade request may cause the administrator to transfer the profile of the first server, including one or more GUIDs associated with the profile, to a second server. In this way, migration is performed more efficiently than in other systems.

If server 204 fails, enclosure manager 106 may detect the failure, at least in part, because failed server 204 will cease to respond to communications from enclosure manager 106. Upon detecting that server 204 has failed, the enclosure manager may send a notification to administrator 300 by way of profile manager 302. The notification may be handled by the administrator in various ways. If the administrator is being controlled by a human entity, a visual and/or audio message may be displayed or played for the user, and the user may take appropriate measures. Other failure detection techniques also may be used.

Upon determining that server 204 has failed, administrator 300 may respond by sending a command to profile manager 302. The command sent to the profile manager may instruct the profile manager to restore the profile of failed server 204 to its factory-default profile, a previously assigned profile, or a newly generated profile, or may instruct the profile manager to change the profile of server 204 to some predetermined profile intended to be assigned to failed servers. The command also may instruct profile manager 302 to assign the profile previously associated with server 204 at the time of failure to backup server 208. If a server having a profile is moved from one enclosure to a new (i.e., different) enclosure, that server's profile may be replaced with a default, predetermined profile. Alternatively, the enclosure manager of the new enclosure may perform this profile replacement.

Upon receiving a command from administrator 300, profile manager 302 may adjust its data structure(s) (e.g., profiles 303) to reflect that the profiles assigned to failed server 204 and backup server 208 have been changed as described above. If backup server 208 already had an associated profile before assuming the profile of failed server 204, that associated profile may be stored elsewhere (e.g., on profile manager 302) for possible future use.

In addition to adjusting its data structures, profile manager 302 may issue commands to enclosure manager 106. One of these commands may be used to adjust the profile associated with failed server 204 and the other command may be used to adjust the profile associated with backup server 208. More specifically, enclosure manager 106 may receive the commands and, in turn, may issue commands to the failed and backup servers to adjust the MAC addresses associated with each of the servers. For example, the enclosure manager may issue the string commands:
set netport206 PermanentAddress=000000000000
which is sent to port 206 of failed server 204, and
set netport210 PermanentAddress=000135228134
which is sent to port 210 of backup server 208. The string command sent to port 206 of failed server 204 may cause server 204 to adjust the data structure stored in NVM 310 so that the MAC address associated with failed server 204 is 000000000000. The MAC address 000000000000 is used for illustrative purposes and another MAC address more suitable for a particular implementation may be used instead. The string command sent to port 210 of backup server 208 may cause server 208 to adjust its MAC address to be 000135228134, which was the MAC address of failed server 204 at the time of failure.

More specifically, the "set netport210" command from enclosure manager 106 may be provided to processor 306 and/or stored to NVM 312, which may include a memory dedicated to storing commands from enclosure manager 106. Processor 306, upon executing the command, may adjust a data structure stored in NVM 314, which associates port 210 with a MAC address. Thus, the data structure in NVM 314 may be adjusted to associate port 210 with the MAC address 000135228134. Other profile properties formerly associated with failed server 204 also may be applied to server 208 as instructed by administrator 300, profile manager 302 and/or enclosure manager 106. Any previous profile data associated with backup server 208 may be overwritten by the new profile data from failed server 204. The previous profile data of backup server 208 may be transferred to storage in backup server 208 for future use prior to being overwritten by the new profile data.

In this way, a profile (i.e., one or more GUIDs) formerly associated with failed server 204 may be assigned to backup server 208. Because backup server 208 is associated with GUID(s) formerly associated with failed server 204, any privileges failed server 204 had to certain devices, resources, etc., as well as any communications that would have previously been sent to failed server 204 by enclosure manager 106, are now provided to server 208. This is, at least in part, because, among the servers in enclosure 102, the GUID(s) are unique to server 208. Stated otherwise, no active (i.e., properly functioning) and/or inactive electronic device that is communicably coupled with server 208 (e.g., within an enclosure and/or within a network) is associated with the same GUID(s) as server 208. Failed server 204 may adjust its profile (including its MAC address and other GUID(s), if any) in a manner similar to that by which server 208 may adjust the profile of server 208. It is assumed that server 204, despite failure, is still able to adjust the profile of server 204. After a profile is migrated from the failed server to the backup server, that profile may be described to be no longer associated (or free from being associated) with the failed server and/or uniquely identifying the backup server on the network.

The migration of profiles as described herein may apply across geographical boundaries. For example, a failed server may be included in one enclosure 102 (e.g., in the United States) and a backup server may be included in a different enclosure (e.g., in China). The infrastructure described above may be modified as needed to migrate the profile of the failed server in the United States to the backup server in China. For example, profile manager 302 may have access to an international network which includes both enclosure 102 and the enclosure in China. In this way, profile manager 302 may communicate with the enclosure manager of each enclosure and thus may migrate the profile of the failed server to a backup server in a different geographical location. The GUID (s) of the profile migrated from the server in the U.S. to the server in China is unique within the international network. Stated otherwise, any GUID(s) migrated from the failed server to the backup server are not associated with any other active and/or inactive server(s) or electronic devices on the same network as the failed server and/or backup server. In this way, profile/GUID duplication is avoided.

Figure 4:
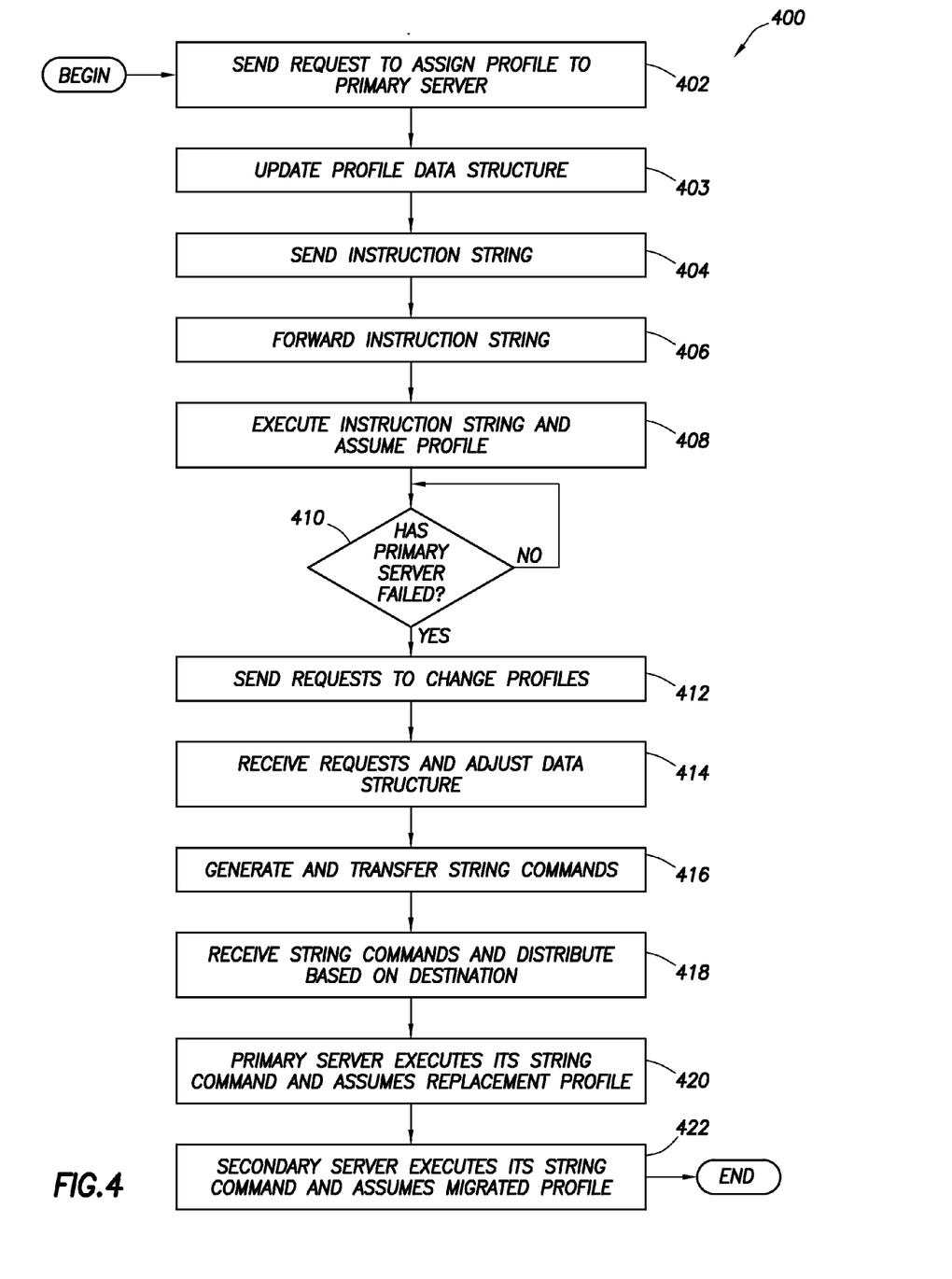
FIG. 4 is a flow chart showing an example of a method of profile management in accordance with an embodiment of the invention.

FIG. 4 shows a flow diagram showing an example of a method of profile management in accordance with an embodiment of the disclosure. While FIG. 4 shows illustrative steps of a method according to one example, other examples may omit, add to, and/or modify any of the steps shown in that figure. A request may be sent from an administrator to a profile manager to assign a profile to a primary server, at 402. The profile manager may update its profile data structure(s), at 403, and may send an instruction string from the profile manager to an enclosure manager associated with the primary server, at 404. The instruction string may be forwarded to the primary server, at 406. The primary server may execute the string and assume a profile associated with one or more GUIDs, at 408.

A determination of whether the primary server has failed may be made, at 410. If the primary server has failed, the administrator may send both a request to the profile manager to change the profile of the primary server and a request to the profile manager to migrate the profile of the primary server to the backup server, at 412. The profile manager may receive the requests and may adjust its profile data structure(s) accordingly, at 414. The profile manager may generate and transfer string commands to the enclosure manager, at 416. The enclosure manager may receive the string commands and distributes the string commands according to the destinations indicated in the commands, at 418. More specifically, the string command intended for the primary server may be transferred to the primary server and the string command intended for the secondary server may be transferred to the secondary server.

The processor of the primary server may execute the received string command and assume its replacement profile, at 420. As described above, the profile of the primary server may be changed to a factory default profile, a previously assigned profile, a newly generated profile, or some predetermined profile used specifically for failed servers. The processor of the secondary server may execute its received string command and assume the profile migrated from the failed server, at 422. In this way, one or more GUIDs previously associated with the failed server are migrated to the backup server. As described above, the profile of the primary server may be changed to a factory default profile, a previously assigned profile, a newly generated profile or some predetermined profile used specifically for failed servers.

Figure 5:
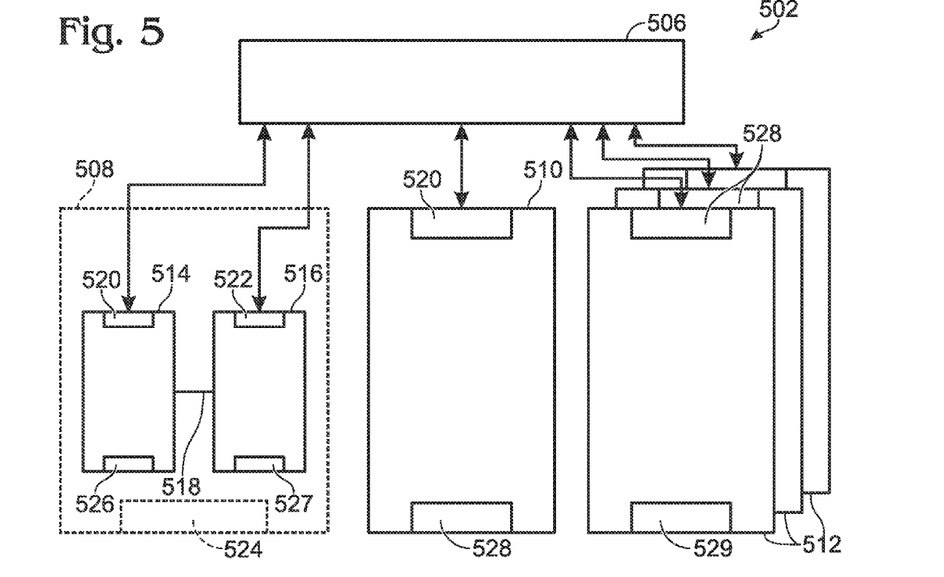
FIG. 5 is a block diagram of the enclosure manager of FIG. 2, shown managing a conjoined server and other servers in an enclosure in accordance with an embodiment of the invention.

Profile management system 100 may be configured to manage the profiles of any suitable type(s) of servers. For example, FIG. 5 is a block diagram of enclosure 102, generally indicated at 502. Enclosure 502 may include an enclosure manager 506, a conjoined server 508, a server 510, and servers 512. Enclosure manager 506 may include any suitable structure configured to manage electronic devices, such as conjoined server 508, server 510, and servers 512, in that enclosure. For example, enclosure manager 506 may include the structure described above for enclosure manager 106. Enclosure manager 506 may be part of another example of a profile management system, generally indicated at 500 in FIG. 6 and further described below. Unless otherwise specified, profile management system 500 may include one or more components and/or one or more functions of profile management system 100 of FIG. 1, and/or vice-versa.

Enclosure manager 506 may perform any suitable types of management operations. For example, the enclosure manager may be configured to read commands from a profile manager and/or an administrator, and forward those commands to the appropriate server(s), as described above.

Additionally, enclosure manager 506 may be configured to manage distribution of power to conjoined server 508, server 510, and/or servers 512. For example, conjoined server 508, server 510, and/or servers 512 may be configured to request permission to power-on (such as via a low-power processor that runs on auxiliary power) from the enclosure manager. Suitable limits may include an arbitrary limit set by a user or the actual power available based on the number and type of power supply modules currently installed and/or operating in enclosure 502. Enclosure manager 506 may limit power consumption of enclosure 502 to any suitable limit(s) by acting on those requests appropriately. For example, the enclosure manager may grant or deny the power-on request. Additionally, enclosure manager 506 may provide a busy indication that denies the power-on request but allows the requesting server to request permission to power-on in a short period of time, such as a few seconds.

Enclosure manager 506 may additionally be configured to receive power-hold requests or instructions from a profile manager and/or an administrator and to deny power-on requests until the power-hold request is released. For example, the enclosure manager may deny power-on requests from server 508, server 510, and/or servers 512 until after a profile manager assigns profiles and/or parts of profiles to one or more of those servers.

Conjoined server 508 may include servers 514 and 516 that are directly or indirectly connected at 518 such that both servers are configured to act as a single server on a network. For example, servers 514 and 516 may be configured to host or run a single operating system or a single operating system instance. Server 514 may include a port 520, while server 516 may include a port 522. Conjoined server 508 may include a profile 524, while server 514 may include a profile 526 and server 516 may include a profile 527. Profile 526 may include a part of profile 524, while profile 527 may include another part of profile 524.

Server 510 may include a port 526 and a profile 528, while servers 512 may include ports 528 and profiles 529. Profiles 524, 526, 527, 528 and 529 may include one or more low-level hardware identifiers, such as a media access control address, a Fiber Channel World Wide Name, serial number, storage area network boot parameter, etc., as discussed for profile 216 above. A profile may uniquely identify the corresponding server and may be transferable from one server to another.

Figure 6:
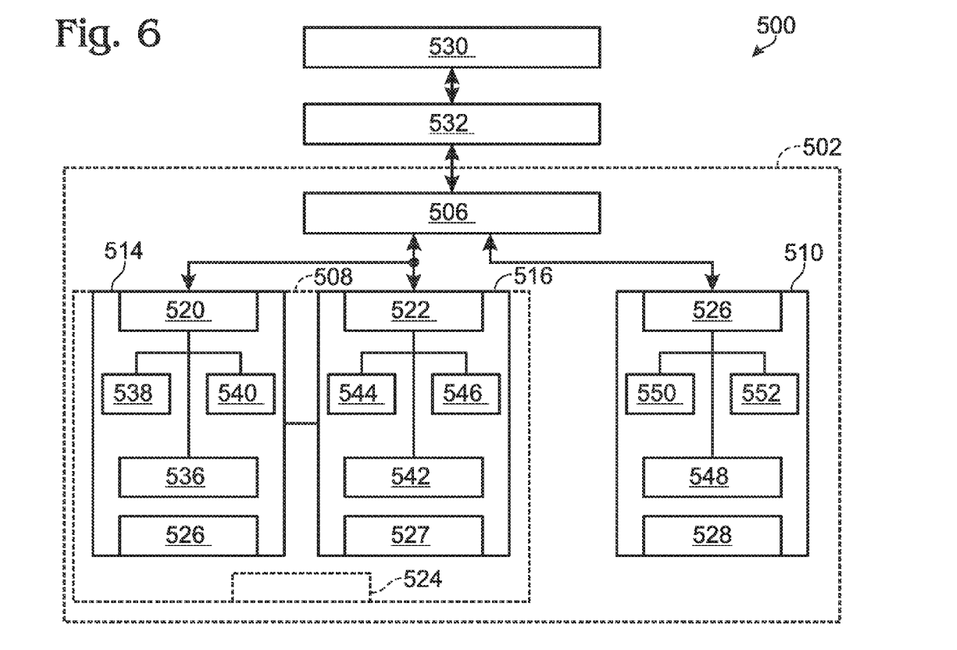
FIG. 6 is a block diagram of the profile management system of FIG. 3, shown managing some of the servers in the enclosure of FIG. 5 in accordance with an embodiment of the invention.

FIG. 6 shows profile management system 500. That system may include an administrator 530, a profile manager 532 and enclosure 502. As discussed above, enclosure 502 may include enclosure manager 506, conjoined server 508 (with server 514 and 516) and server 510. Although servers 512 are not shown to be included in enclosure 502 of FIG. 6, those servers are understood to be included in enclosure 502. Server 514 may include a processor 536 and NVMs 538 and 540, which may be coupled to port 520. Similarly, server 516 may include a processor 542 and NVMs 544 and 546, which may be coupled to port 522. Server 510 may include a processor 548 and NVMs 550 and 552, which may be coupled to port 526. The NVMs may include any suitable structure, such as the structure described above for NVMs 308, 310, 312 and 314. Although servers 514 and 516 are shown to include two NVMs each, one or both servers may include less or more NVMs, such as one, three, or four NVMs.

Administrator 530 may include any suitable structure coupled to the profile manager and configured to issue commands to the profile manager, such as an administrative computer. For example, the administrator may issue one or more commands instructing the profile manager to migrate one or more profiles.

Profile manager 532 may include any suitable structure configured to manage a plurality of profiles (with each profile uniquely identifying a server on the network), such as the structure described above. The profiles managed by profile manager 532 may be generated by any suitable technique(s), including the techniques described above. Profile manager 532 may be configured to manage the profiles in any suitable way(s). For example, the profile manager may be configured to assign or associate profiles to conjoined server 508 and server 510, such as after receiving one or more commands from the administrator instructing such assignments.

Profile manager 532 may receive the commands and determine if one or more of those commands involve conjoined server(s). If a conjoined server is involved, the profile manager may be configured to determine which part(s) of a profile to be assigned goes to each server of a conjoined server, and to issue commands to enclosure manager 502 accordingly. For example, if a profile 524 is to be assigned to conjoined server 508, profile manager 532 may be configured to determine a part of profile 524 that is to be assigned to profile 526 of server 514, and another part of profile 524 that is to be assigned to profile 527 of server 516, and to issue commands to enclosure manager 502 to assign those parts to the profiles of those servers. Additionally, a profile 528 may be assigned to server 510.

The profile manager may be configured to determine how to distribute identifiers or properties of profile 524 between profiles 526 and 527 based on any suitable criteria. For example, the profile manager may make that determination based on which server of the conjoined server is configured to run an operating system for the conjoined server and/or configured to export the conjoined server's user interface for an administrator to use. If server 514 is configured to run an operating system for conjoined server 508, profile manager 532 may include one or more identifiers associated with the conjoined server in profile 526. Those identifiers may include, for example, a serial number of conjoined server 508. Alternatively, if server 516 is configured to run the operating system, then those identifiers may be included in profile 527.

Additionally, or alternatively, profile manager 532 may determine how to distribute identifiers of profile 524 between profiles 526 and 527 based on the number and type of ports that servers 514 and 516 have. Those identifiers may include, for example, Ethernet entries (such as MAC addresses), Fiber Channel entries (such as WWNs), etc. The profile manager may distribute the identifiers equally across profiles 526 and 527. For example, the profile manager may distribute identifiers related to Ethernet I/O devices evenly across profiles 526 and 527 such that there is a balanced number of Ethernet ports used across servers 514 and 516. Alternatively, profile manager 532 may distribute the identifiers to one part before distributing to the other part and/or any other suitable method of distribution. For example, the profile manager may distribute identifiers related to Fiber Channel I/O devices across profiles 526 and 527 such that all of the Fiber Channel ports of server 514 are used before using those ports of server 516, or vice-versa.

Although conjoined server 508 is comprised of servers 514 and 516 that are associated with profiles 526 and 527, respectively, administrator 530 is not aware that conjoined server 508 is comprised of those servers and that profile 524 of that conjoined server is divided into different parts/profiles. Thus, administrator 530 may manage conjoined server 508 similar to other non-conjoined servers.

Once the profile manager determines how to distribute identifiers of profile 524 between profiles 526 and 527, it may send one or more commands to the enclosure manager to associate profile 526 with server 514 and associate profile 527 with server 516. The commands may include any suitable commands, such as the string commands described above. The enclosure manager may read the commands and forward the commands to the appropriate server(s). The processors of those servers may execute the received commands and assumes the assigned profile.

Profile manager 532 may be configured to migrate a profile from server 510 to conjoined server 508, or from conjoined server 508 to server 510, such as responsive to a command from the administrator. For example, when profile 528 of server 510 needs to be migrated to conjoined server 508, profile manager 532 may determine which part(s) of profile 528 should be included in profile 526 to be associated with server 514, and which part(s) of profile 528 should be included in profile 527 to be associated with server 516. The profile manager may issue commands to enclosure manager 506 to assign profile 526 to server 514 and to assign profile 527 to server 516. Profile manager 532 may additionally issue commands to enclosure manager 506 to assign a different profile to server 510.

Alternatively, when profile 524 of conjoined server 508 needs to be migrated to server 510, profile manager 532 may issue commands to enclosure manager 506 to assign profile 524 to server 510. Additionally, the profile manager may determine a first part of a different profile to assign server 514 and another part of the different profile to assign server 516. Although FIG. 6 shows profile management system 500 configured to manage a server and a conjoined server, the profile management system may alternatively, or additionally, be configured to manage two or more conjoined servers and/or two or more other servers. For example, the profile management system may be configured to manage two, three, or four conjoined servers and/or two, three, or four other servers. Additionally, although the conjoined server is shown to include two connected servers, the conjoined server may include three, four, five or more connected servers.

Before profiles are assigned, profile manager 532 may be configured to instruct the enclosure manager to deny power-on requests from servers 510, 514 and 516 until after the profile manager and/or enclosure manager assigns profiles (or parts of profiles) to those servers. For example, profile manager 532 may instruct the enclosure manager to place a power hold on one or more of the servers during the migration. Enclosure manager 506 may provide the requesting server a busy indication until the profile manager releases the power hold for that server.

Profile manager 532 may additionally, or alternatively, be configured to migrate a profile of a server or conjoined server when that server is disconnected from the network (such as when the server is being repaired, etc.), and to associate a different profile when the disconnected server is reconnected to the network. For example, the profile manager may be configured to recognize that the reconnected server is connected to the network with previously applied profile settings but that profile is no longer assigned to it. Profile manager 532 may be configured to place a power hold on that reconnected server (so that it does not power on with the settings of the migrated profile) and assign a different profile to the reconnected server. For example, when migrating profile 528 to conjoined server 508, the profile manager may be configured to migrate that profile when one or both of servers 514 and 516 are disconnected from the network. Additionally, profile manager 532 may be configured to associate a part of profile 528 to server 514 and another part of profile 528 to server 516 when those servers are reconnected with the network.

The profile manager may alternatively, or additionally, be configured to wait until the affected servers are powered off before migrating a profile. For example, when migrating profile 524 of conjoined server 508 to server 510, profile manager 532 may be configured to wait until servers 510, 514 and 516 are powered off before providing commands to the enclosure manager to migrate profile 524. Alternatively, when migrating profile 528 of server 510 to conjoined server 508, the profile manager may be configured to wait until servers 510, 514 and 516 are powered off before providing commands to the enclosure manager to assign a part of profile 528 to server 514 and another part of profile 528 to server 516.

Figure 7:
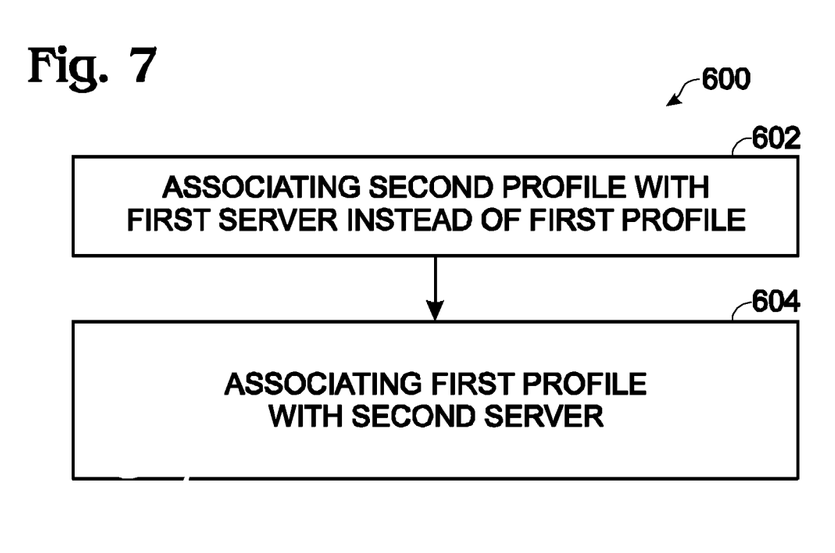
FIG. 7 is a flow chart showing an example of a method of profile management involving at least one conjoined server in accordance with an embodiment of the invention.

FIG. 7 shows an example of a method, which is generally indicated at 600, of profile management on a network, the network including a first server associated with a first profile that uniquely identifies the server on the network, and a second server coupled to the first server, at least one of the first and second servers being a conjoined server. While FIG. 7 shows illustrative steps of a method according to one example, other examples may omit, add to, and/or modify any of the steps shown in that figure.

As illustrated in FIG. 7, the method may include associating a second profile with the first server instead of the first profile, the second profile being different from the first profile, at 602. Where the second server is a conjoined server that includes, for example, third and fourth servers, that step may include associating a part of the first profile to the third server and another part of the first profile to the fourth server. The first profile may be associated with the second server, at 604. Where the first server is a conjoined server that includes, for example, fifth and sixth servers, that step may include associating a part of the second profile to the fifth server and another part of the second profile to the sixth server.

Any suitable structure may be used to perform one or more steps of the above method, such as the profile management systems described above. Those systems also may include computer-readable media comprising computer-executable instructions for profile management on a network, the computer-executable instructions being configured to perform one or more steps of method 600 discussed above.

We claim:

1. A profile management system for first and second servers on a network, comprising:
a profile manager executing on a computer to manage a first profile that uniquely identifies the first server on the network;
an administrator executing on a computer to issue a command to the profile manager instructing the profile manager to migrate the first profile such that the first profile is no longer associated with the first server, and such that the first profile uniquely identifies the second server on the network, wherein the second server is a conjoined server that includes third and fourth servers, wherein the profile manager, when migrating the first profile, assigns a part of the first profile to the third server, and assigns another part of the first profile to the fourth server; and
an enclosure manager configured to manage distribution of power to the first, third, and fourth servers, wherein, when the profile manager migrates the first profile, the enclosure manager denies power-on requests from the third and fourth servers until after the profile manager assigns the part of the first profile to the third server and the another part of the first profile to the fourth server.

2. The system of claim 1, wherein the third server runs a single operating system instance for the conjoined server, and the part of the first profile includes an identifier associated with the conjoined server.

3. The system of claim 2, wherein the identifier includes a serial number of the conjoined server.

4. The system of claim 1, wherein each of the first, third, and fourth servers includes a plurality of ports, the part of the first profile including an identifier for each of two or more ports of the plurality of ports of the third server.

5. The system of claim 4, wherein the identifier includes a media access control address.

6. The system of claim 4, wherein the identifier includes a world wide name.

7. The system of claim 1, wherein the profile manager is further configured to associate a second profile different from the first profile to the first server when the first profile is migrated to the second server.

8. The system of claim 7, wherein the first server is a conjoined server that includes fifth and sixth servers, and the profile manager is further configured to associate a part of the second profile to the fifth server and another part of the second profile to the sixth server when the first profile is migrated to the second server.

9. The system of claim 1, wherein the profile manager is configured to migrate the first profile when the first server is disconnected from the network, and to associate a second profile different from the first profile when the first server is reconnected with the network.

10. The system of claim 9, wherein the first server is a conjoined server that includes fifth and sixth servers, wherein the profile manager is further configured to migrate the first profile when at least one of the fifth and sixth servers is disconnected from the network, and to associate a part of the second profile to the fifth server and another part of the second profile to the sixth server when the at least one of the fifth and sixth servers is reconnected with the network.

11. The system of claim 1, wherein the profile manager is further configured to wait until the first and second servers are powered off before migrating the first profile to the second server.

12. The system of claim 11, wherein the profile manager is configured to assign the part of the first profile to the third server and the another part of the first profile to the fourth server when the first, third, and fourth servers are powered off.

13. A network, comprising:
a first server computer associated with a first profile that uniquely identifies the first server on the network;
a second server computer coupled to the first server, wherein second server computer is a conjoined server that includes third and fourth servers;
a profile manager configured to manage the first profile;
an administrator configured to issue a command to the profile manager instructing the profile manager to migrate the first profile such that the first profile is free from being associated with the first server, and such that the first profile uniquely identifies the second server on the network, wherein the profile manager, when migrating the first profile, assigns a part of the first profile to the third server, and assigns another part of the first profile to the fourth server; and
an enclosure manager configured to manage distribution of power to the first, third, and fourth servers, wherein, when the profile manager migrates the first profile, the enclosure manager denies power-on requests from the third and fourth servers until after the profile manager assigns the part of the first profile to the third server and the another part of the first profile to the fourth server.

14. The network of claim 13, wherein the first server is a conjoined server that includes fifth and sixth servers, and the profile manager is further configured to associate a part of a second profile to the fifth server, and another part of the second profile to the sixth server when the first profile is migrated to the second server, the second profile being different from the first profile.

15. A method of profile management on a network, the network including a first server associated with a first profile that uniquely identifies the server on the network, and a second server coupled to the first server, the second server being a conjoined server, comprising:
  associating a second profile with the first server instead of the first profile, the second profile being different from the first profile;
  associating the first profile with the second server, where the conjoined second server includes third and fourth servers, and wherein associating the first profile with the second server includes associating a part of the first profile with the third server and another part of the first profile with the fourth server; and
  managing distribution of power to the first, third, and fourth servers, wherein, when associating the first profile, denying power-on requests from the third and fourth servers until after associating the part of the first profile with the third server and the another part of the first profile with the fourth server.

16. The method of claim 15, where the first server is a conjoined server that includes fifth and sixth servers, and wherein associating the second profile with the first server includes associating a part of the second profile with the fifth server and another part of the second profile with the sixth server.

* * * * *

UNITED STATES PATENT AND TRADEMARK OFFICE
CERTIFICATE OF CORRECTION

PATENT NO. : 8,688,838 B2  Page 1 of 1
APPLICATION NO. : 12/637532
DATED : April 1, 2014
INVENTOR(S) : Jim Darling et al.

It is certified that error appears in the above-identified patent and that said Letters Patent is hereby corrected as shown below:

In the Claims

In column 12, line 42, in Claim 13, delete "wherein" and insert -- wherein the --, therefor.

In column 12, line 61, in Claim 14, delete "l3," and insert -- 13, --, therefor.

Signed and Sealed this
Twelfth Day of August, 2014

Michelle K. Lee
*Deputy Director of the United States Patent and Trademark Office*